US007191275B2

(12) United States Patent
Arackal et al.

(10) Patent No.: US 7,191,275 B2
(45) Date of Patent: Mar. 13, 2007

(54) SYSTEM AND METHOD FOR THE MANAGEMENT OF HARDWARE TRIGGERED HOTPLUG OPERATIONS OF INPUT/OUTPUT CARDS

(75) Inventors: Paulose Kuriakose Arackal, Cochin (IN); Harish K, Calicut (IN); Suresh Venkatasubbaiah, Cupertino, CA (US); Muppirala Kishore Kumar, Bangalore (IN); Michael Wisner, Dallas, TX (US); Jean-Marc Eurin, Cupertino, CO (US); Ryan R. Houdek, Fort Collins, CO (US); Shoba Iyer, San Jose, CA (US); Anand Ananthabhotia, Cupertino, CA (US); Adiseshan Muthugopalakrishnan, III, Bangalore (IN); Chetham Seshadri, Sunnyvale, CA (US); David M. Caswell, Santa Clara, CA (US); Bahudhanam Shyam Prasad, Bangalore (IN); Harish S. Babu, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 166 days.

(21) Appl. No.: 10/953,492

(22) Filed: Sep. 28, 2004

(65) Prior Publication Data
US 2006/0069835 A1    Mar. 30, 2006

(51) Int. Cl.
*G06F 13/00*     (2006.01)
(52) U.S. Cl. .................................. 710/302; 710/262
(58) Field of Classification Search ........ 710/301–304, 710/262–263
See application file for complete search history.

(56) References Cited

U.S. PATENT DOCUMENTS 5,991,900 A * 11/1999 Garnett ........................ 714/56

(Continued)

*Primary Examiner*—Mark H. Rinehart
*Assistant Examiner*—Clifford Knoll
(74) *Attorney, Agent, or Firm*—Ladas & Parry LLP

(57) ABSTRACT

A method is provided of managing hardware triggered hotplug operations of one or more input/output (I/O) cards of a computer system.

The method comprises receiving hardware triggers, each of which relates to a hotplug operation to be carried out on an I/O card associated with a card slot, placing the hardware triggers in a queue, and processing the queue of hardware triggers. The method further comprises processing one or more of said hardware triggers. This comprises analysing a hardware trigger to determine the card slot to which said hardware trigger relates, and consulting a hotplug operation policy to determine whether hotplug operations are enabled for said card slot. If hotplug operations are not enabled for said card slot, this further comprises ignoring said hardware trigger, and if hotplug operations are enabled for said card slot, this further comprise querying said slot to determine whether it contains a card. If said card slot does not contain a card, this further comprises ignoring said hardware trigger, and if said card slot does contain a card, determining the nature of the hotplug operation of said hardware trigger. If said hotplug operation is a delete card hotplug operation or a suspend card hotplug operation, this further comprises determining whether said card is essential or non-essential to said computer system, and ignoring said delete card hotplug operation or said suspend card hotplug operation when said card is essential, and performing said delete card hotplug operation or said suspend card hotplug operation when said card is non-essential. If said hotplug operation is an add card hotplug operation or a resume card hotplug operation, this further comprises performing said add card hotplug operation or said resume card hotplug operation.

39 Claims, 2 Drawing Sheets

U.S. PATENT DOCUMENTS

| | | | |
|---|---|---|---|
| 7,035,954 B1 * | 4/2006 | Duran | 710/302 |
| 2004/0243725 A1 * | 12/2004 | Yakovlev et al. | 710/1 |
| 2004/0268002 A1 * | 12/2004 | Arramreddy | 710/302 |
| 2005/0081080 A1 * | 4/2005 | Bender et al. | 714/2 |

* cited by examiner

SYSTEM AND METHOD FOR THE MANAGEMENT OF HARDWARE TRIGGERED HOTPLUG OPERATIONS OF INPUT/OUTPUT CARDS

FIELD OF THE INVENTION

The invention relates to the field of input/output (I/O) cards, such as Peripheral Component Interconnect (PCI) cards, and a system and method for the management of hotplug operations on these cards, i.e. addition or deletion of a card from an associated computer system.

BACKGROUND OF THE INVENTION

The maintenance, repair and upgrade of computer systems often requires the addition or deletion of I/O cards. An increasing number of computer systems now support such I/O card hotplug operations, whilst the system is operational. I/O card interconnect standards like the PCI Standard Hot-Plug Controller and Subsystem Specification, revision 1.0, define hand-shake signals and independent power control, enabling card hotplug operations in isolation, without affecting other parts of the computer system. Such hotplug operations for various I/O cards greatly assist in I/O hardware reconfigurations for better utilization of the computer system, and in repairing faulty components 'online', i.e. without having to power down the computer system.

I/O card hotplug operations can be initiated either through software tools or through hardware triggers. I/O card interconnect standards, like the PCI specification, have defined a standard for hardware triggered hotplug operations. The PCI specification defines that a hardware triggered hotplug operation (for adding/deleting an I/O card) can be initiated by pressing a push button (referred to in the specification as an 'attention button' and known as a 'doorbell') associated with the slot in which the I/O card resides. Hardware triggered hotplug operations are carried out with minimum/no interaction between a user and software tools. When hotplug operations are carried out on I/O cards through hardware triggers, a number of problems have been encountered with current software management of these hardware triggered I/O card hotplug operations. For example, multiple simultaneous hardware triggers for different card slots or the same card slot can occur, and these are not always handled well. In the absence of controls on the permitted hotplug operations, accidental/malicious use of hardware triggers can occur, and an I/O card which is essential to the operation of the computer system could be deleted.

SUMMARY OF THE INVENTION

It is desirable that an operating system of a computer system associated with the I/O cards, manages the hardware triggered I/O card hotplug operations, to ensure that they are handled gracefully. We propose a management method to be implemented in an operating system of a computer system having one or more associated I/O cards, for the management of hardware triggered hotplug operations of the I/O cards.

According to a first aspect of the invention there is provided a method of managing hardware triggered hotplug operations of one or more input/output (I/O) cards of a computer system, comprising receiving hardware triggers, each of which relates to a hotplug operation to be carried out on an I/O card associated with a card slot, placing said hardware triggers in a queue, processing said queue of hardware triggers, processing one or more of said hardware triggers, by analysing a hardware trigger to determine the card slot to which said hardware trigger relates, consulting a hotplug operation policy to determine whether hotplug operations are enabled for said card slot, if hotplug operations are not enabled for said card slot, ignoring said hardware trigger, if hotplug operations are enabled for said card slot, querying said slot to determine whether it contains a card, if said card slot does not contain a card, ignoring said hardware trigger, if said card slot does contain a card, determining the nature of the hotplug operation of said hardware trigger, if said hotplug operation is a delete card hotplug operation or a suspend card hotplug operation, determining whether said card is essential or non-essential to said computer system, and ignoring said delete card hotplug operation or said suspend card hotplug operation when said card is essential, and performing said delete card hotplug operation or said suspend card hotplug operation when said card is non-essential, or if said hotplug operation is an add card hotplug operation or a resume card hotplug operation, performing said add card hotplug operation or said resume card hotplug operation.

According to a second aspect of the invention there is provided a method of managing hardware triggered hotplug operations of one or more input/output (I/O) cards of a computer system, comprising receiving hardware triggers, each of which relates to a hotplug operation to be carried out on an I/O card associated with a card slot, placing said hardware triggers in queue, and processing said queue of hardware triggers.

According to a third aspect of the invention there is provided a method of managing hardware triggered hotplug operations of one or more input/output (I/O) cards of a computer system, comprising receiving hardware triggers, each of which relates to a hotplug operation to be carried out on a I/O card associated with a card slot, processing one or more of said hardware triggers by analysing a hardware trigger to determine the card slot to which said hardware trigger relates, consulting a hotplug operation policy to ascertain whether hotplug operations are enabled for said card slot, if hotplug operations are not enabled for said card slot, ignoring said hardware trigger, and if hotplug operations are enabled for said card slot, further processing the hardware trigger.

According to a fourth aspect of the invention there is provided a method of managing hardware triggered hotplug operations of one or more input/output (I/O) cards of a computer system, comprising receiving hardware triggers, each of which relates to a hotplug operation to be carried out on a I/O card associated with a card slot, processing one or more of said hardware triggers by analysing a hardware trigger to determine the card slot to which said hardware trigger relates, querying said card slot to determine whether it contains a card, if said card slot does not contain a card, ignoring said hardware trigger, if said card slot does contain a card, determining the nature of the hotplug operation of said hardware trigger, and further processing said hotplug operation of said hardware trigger.

According to a fifth aspect of the invention there is provided a method of managing hardware triggered hotplug operations of one or more input/output (I/O) cards of a computer system, comprising receiving hardware triggers, each of which relates to a hotplug operation to be carried out on an I/O card associated with a card slot, processing one or more of said hardware triggers, by analysing a hardware trigger to determine the card slot to which said hardware trigger relates, querying said card slot to determine whether it contains a card, if said card slot does not contain a card, ignoring said hardware trigger, if said card slot does contain a card, determining whether said card is essential or non-essential to said computer system, and ignoring said hotplug operation of said hardware trigger when said card is essential, and performing said hotplug operation of said hardware trigger when said card is non-essential.

According to a sixth aspect of the invention there is provided a system for managing hardware triggered hotplug operations of one or more input/output (I/O) cards of a computer system, comprising a hotplug system driver which receives hardware triggers, each of which relates to a hotplug operation to be carried out on an I/O card associated with a card slot, and places said hardware triggers in a hotplug event queue, a hotplug service daemon which processes said queue of hardware triggers, processing one or more of said hardware triggers by analysing a hardware trigger to determine the card slot to which said hardware trigger relates, consulting a hotplug operation policy to ascertain whether hotplug operations are enabled for said card slot, if hotplug operations are not enabled for said card slot, ignoring said hardware trigger, if hotplug operations are enabled for said card slot, querying said card slot to determine whether it contains a card, if said card slot does not contain a card, ignoring said hardware trigger, if said card slot does contain a card, determining the nature of the hotplug operation of said hardware trigger, a critical resource analysis module which, when said hotplug operation is a delete card hotplug operation or a suspend card hotplug operation, determines if said card is essential or non-essential to said computer system, and instructs said hotplug service daemon to ignore said hotplug operation of said hardware trigger when said card is essential to said computer system, and perform said hotplug operation of said hardware trigger when said card is non-essential to said computer system, and a hotplug command module which performs said hotplug operation of said hardware trigger on the instructions of said hotplug service daemon using said hotplug system driver.

According to a seventh aspect of the invention there is provided a method of adding an I/O card to a computer system, comprising placing said card in a card slot, creating a hardware trigger which relates to a hotplug operation to be carried out on said card in said card slot, placing said hardware trigger in a queue, processing said hardware trigger, by analysing said hardware trigger to determine said card slot to which said hardware trigger relates, consulting a hotplug operation policy to ascertain whether hotplug operations are enabled for said card slot, if hotplug operations are not enabled for said card slot, ignoring said hardware trigger, if hotplug operations are enabled for said card slot, querying said slot to determine whether it contains a card, if said card slot does not contain a card, ignoring said hardware trigger, if said card slot does contain a card, determining that the hotplug operation is an add card hotplug operation, and performing said add card hotplug operation of said hardware trigger, to add said card to said computer system.

According to an eighth aspect of the invention there is provided a method of deleting an I/O card from a computer system, comprising creating a hardware trigger which relates to a hotplug operation to be carried out on said I/O card in a card slot, placing said hardware trigger in a queue, processing said hardware trigger, by analysing said hardware trigger to determine the card slot to which said hardware trigger relates, consulting a hotplug operation policy to ascertain whether hotplug operations are enabled for said card slot, if hotplug operations are not enabled for said card slot, ignoring said hardware trigger, if hotplug operations are enabled for said card slot, querying said slot to determine whether it contains a card, if said card slot does not contain a card, ignoring said hardware trigger, if said card slot does contain a card, determining that the hotplug operation is a delete card hotplug operation, and performing said delete card hotplug operation of said hardware trigger.

According to a ninth aspect of the invention there is provided a computer program, residing on a computer readable medium, for managing hardware triggered hotplug operations of one or more input/output (I/O) cards of a computer system, said program comprising executable instructions that enable said computer system to receive hardware triggers, each of which relates to a hotplug operation to be carried out on an I/O card associated with a card slot, place said hardware triggers in a queue, process said queue of hardware triggers, process one or more of said hardware triggers, by analyse a hardware trigger to determine the card slot to which said hardware trigger relates, consult a hotplug operation policy to ascertain whether hotplug operations are enabled for said card slot, if hotplug operations are not enabled for said card slot, ignore said hardware trigger, if hotplug operations are enabled for said card slot, query said slot to determine whether it contains a card, if said card slot does not contain a card, ignore said hardware trigger, if said card slot does contain a card, determine the nature of the hotplug operation of said hardware trigger, and if said hotplug operation is a delete card hotplug operation or a suspend card hotplug operation, determine whether said card is essential or non-essential to said computer system, and ignore said delete card hotplug operation or said suspend card hotplug operation when said card is essential, and perform said delete card hotplug operation or said suspend card hotplug operation when said card is non-essential, or if said hotplug operation is an add card hotplug operation or a resume card hotplug operation, perform said add card hotplug operation or said resume card hotplug operation.

DETAILED DESCRIPTION OF THE PREFERRED EMBODIMENTS

Figure 1:
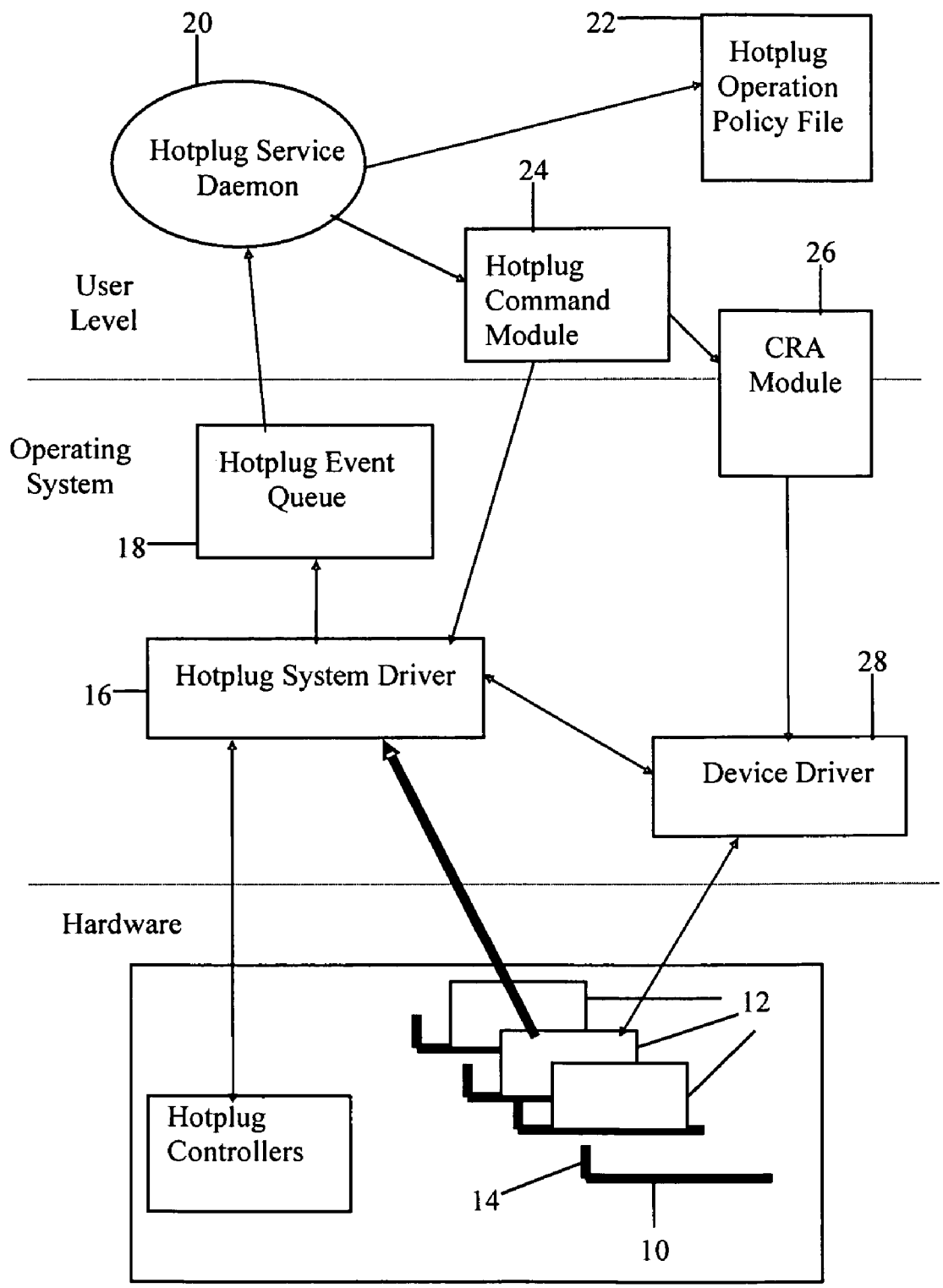
FIG. 1 is a block diagram of a system for managing hardware triggered hotplug operations of input/output (I/O) cards of a computer system.

The system of FIG. 1 comprises a plurality of I/O card slots 10, card slots no.1 to no.3 of which contain I/O cards 12. The cards may comprise a variety of types of card, e.g. SCSI, fibre channel or Ethernet cards. Various interconnect technologies may be used for the cards, e.g. that defined in the PCI specification, referred to previously. Each of the card slots 10 support hardware triggering of hotplug operations on a card associated with the card slot. Each card slot is provided with a momentary-contact push button or 'doorbell' 14, located adjacent to the card slot. Pressing the doorbell associated with a card slot produces a hardware trigger, which indicates that a hotplug operation is to be carried out on a card associated with the card slot. It will be appreciated that this only one method of producing hardware triggers. The method of and system for managing such triggers is applicable to all hardware triggers, regardless of their method of generation.

The system of FIG. 1 further comprises a hotplug system driver 16, which is a software module contained in the operating system of the computer system. The hotplug system driver 16 receives hardware triggers associated with the I/O card slots. The hotplug system driver 16 is also involved in processing of hotplug operations, and in particular controls the connection and disconnection of power to each card slot.

The system of FIG. 1 further comprises a hotplug event queue 18, which is a storage software module provided in the operating system of the computer system. The hotplug system driver 16 places each hardware trigger which it receives into the hotplug event queue 18.

The system of FIG. 1 further comprises a hotplug service daemon 20. This is a software module contained in the operating system of the computer system. The hotplug service daemon 20 processes the hardware triggers in the hotplug event queue 18.

The system of FIG. 1 further comprises a hotplug operation policy file 22. This is a storage software module in the operating system of the computer system. The hotplug operation policy file 22 comprises a list of identifiers of card slots for which hotplug operations are permitted, and preferably also contain details of the hotplug operation or operations that are permitted for each card slot whose identifier is included in the policy file. The policy file is maintained by a system administrator of the computer system. As part of processing a hardware trigger, the hotplug service daemon consults the hotplug operation policy file to check whether, and preferably what, hotplug operations are permitted for the card slot associated with the hardware trigger.

The system of FIG. 1 further comprises a hotplug command module 24. This is also a software module provided in the operating system of the computer system. The hotplug command module is a tool responsible for initiating hotplug operations. The hotplug service daemon 20 invokes the hotplug command module to process the hotplug operation of a hardware trigger.

The system of FIG. 1 further comprises a critical resource analysis (CRA) module 26. This is also a software module provided in the operating system of the computer system. The CRA module 26 is plugged into the hotplug command module 24, and, on the instructions of the command module, carries out a critical resource analysis to determine whether the I/O card associated with a hardware trigger is essential or non-essential to the functioning of the computer system.

The system of FIG. 1 further comprises a device driver associated with each card slot 10. Only the device driver 28 associated with card slot no.2 is shown. The device drivers are software modules provided in the operating system of the computer system. Each device driver controls the operation of the I/O card in the hotplug capable card slot associated with the driver.

Figure 2:
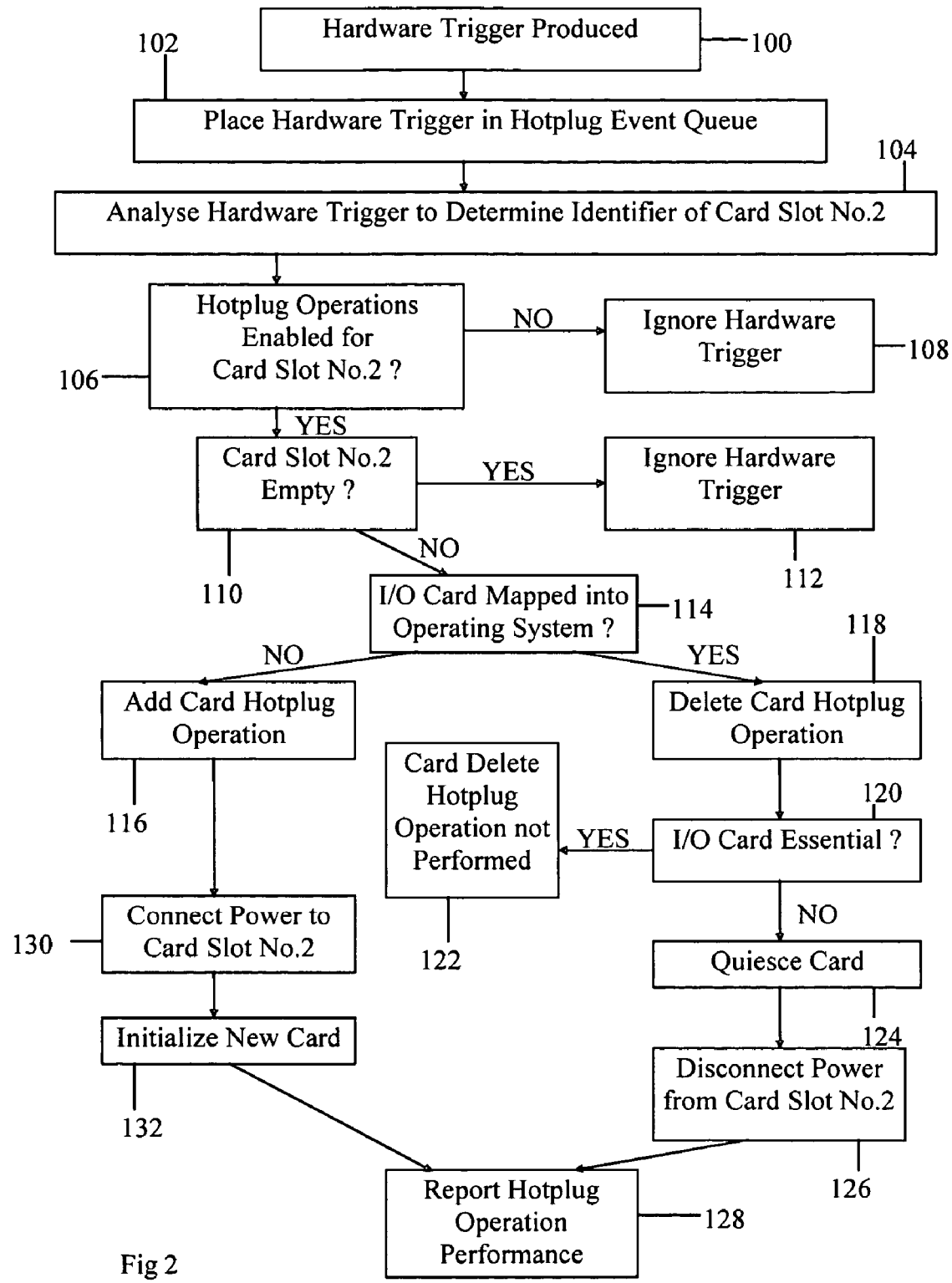
FIG. 2 is a flowchart of a method of managing hardware triggered hotplug operations of input/output (I/O) cards of a computer system.

The operation of the system of FIG. 1 will now be described in more detail, with reference to card slot no.2 and with the help of the flowchart of FIG. 2.

A user of the computer system may wish to add an I/O card to the computer system, or delete an I/O card already associated with the computer system. To add a card to card slot no.2, the user inserts the card 12 into the empty card slot no.2, so that it is properly connected thereto, and presses the doorbell 14 associated with this card slot, to initiate an add card hotplug operation on the I/O card 12. To delete an I/O card already in the card slot no.2, the user presses the doorbell 14 associated with this card slot to initiate a delete card hotplug operation on the I/O card. Therefore, for addition or deletion of the I/O card, the doorbell 14 associated with card slot no.2 is pressed which results in a hardware trigger, as illustrated at step 100 of FIG. 2. The hotplug system driver 16 within the operating system of the computer system receives the hardware trigger and places it in the hotplug event queue 18, as illustrated at step 102. Although the discussion is limited to a hardware trigger associated with card slot no.2, it will be appreciated that hardware triggers are also received from the other card slots, and multiple hardware triggers may be received from any particular card slot. Each hardware trigger received by the hotplug system driver 16 is placed in the hotplug event queue 18. Placing the hardware triggers in the hotplug event queue allows easier handling of the hardware triggers by the operating system, particularly when multiple hardware triggers are received at the same time or substantially the same time, and decreases the likelihood of any of the hardware triggers being dropped by the operating system.

The hotplug service daemon 20 services the hotplug event queue 18, processing the queue of hardware triggers. Processing the queue comprises monitoring the queue to determine if a hardware trigger has been dealt with. Monitoring the queue in this way allows identification of hardware triggers which have not been dealt with, and processing of these can, for example, be expedited. This allows graceful processing of the hardware triggers, particularly when multiple hardware triggers are received at or near the same time. Processing the queue further comprises scanning the hardware triggers in the queue, determining if the queue comprises a multiple of hardware triggers relating to a hotplug operation to be carried out on the same I/O card associated with the same card slot, which triggers have been received at or substantially at the same time, and deleting all but one of the multiple of hardware triggers. Use of the hotplug event queue improves the computer system's responsiveness, by enabling the operating system to spawn parallel hotplug operations if the queued triggers do not have mutual dependencies.

The hotplug service daemon 20 then processes the hardware trigger associated with card slot no.2. The hotplug service daemon 20 first analyses the hardware trigger to determine an identifier which identifies the card slot as slot no.2, as illustrated at step 104. The hotplug service daemon 20 then consults the hotplug operation policy file 22, to check if hotplug operations are enabled for card slot no.2, as illustrated at step 106. This comprises determining if hotplug operations are permitted for the card slot. The hotplug service daemon 20 compares the identifier of card slot no.2 with a list of card slot identifiers contained in the hotplug operation policy file 22. If the identifier of card slot no.2 matches any card slot identifier contained in the policy file, it is determined that hotplug operations are permitted for card slot no.2. If the identifier of card slot no.2 does not match any card slot identifier contained in the policy file, it is determined that hotplug operations are not permitted for card slot no.2. If hotplug operations are not permitted for card slot no.2, the hardware trigger is ignored, and the hotplug operation associated with the trigger is not carried out, as illustrated at step 108.

The above describes a first level of granularity of checking for card slots for which hotplug operations are enabled, which may be employed in embodiments of the invention. A further level of granularity of checking for card slots for which hotplug operations are enabled may be employed. If the identifier of card slot no.2 matches any card slot identifier contained in the policy file, it is determined that hotplug operations are permitted, and further what hotplug operation or operations are permitted, for card slot no.2. If the identifier of card slot no.2 does not match any card slot identifier contained in the policy file, it is determined that no hotplug operations are permitted for card slot no.2. The processing of the hotplug operation of the hardware trigger of card slot no.2, will depend on whether the hotplug operation of the hardware trigger is permitted. The use of a policy file provides a mechanism that helps to prevent accidental/malicious use of hardware triggered hotplug operations.

If hotplug operations are permitted for card slot no.2, the hardware trigger is further processed by the hotplug service daemon 20. A check is carried out to see if an I/O card is present in the card slot no.2, as illustrated at step 110. If no card is present in the slot, the hardware trigger is ignored, and the hotplug operation associated with the trigger is not performed, as illustrated at step 112. If a card is present in the card slot no.2, the nature of the hotplug operation associated with the hardware trigger of card slot no. 2 is determined. A check is carried out to ascertain if the card is mapped into the operating system of the computer system, as illustrated at step 114. If this is the case, the hotplug operation is interpreted as a delete card operation, as illustrated at step 118. If the card is not mapped into the operating system, the hotplug operation is interpreted as an add card operation, as illustrated at step 116.

Once the hotplug operation is determined, the hotplug service daemon instructs the hotplug command module 24 to perform the add card or delete card hotplug operation. Using the hotplug command module 24 for performing the hotplug operation, which is separate from the hotplug service daemon 22 improves the operating system responsiveness for hotplug operations. With this approach, the hotplug service daemon 22 need not wait until each hotplug operation is completed, to process the next hardware trigger. Once a hotplug operation is handed off to the hotplug command module 24, the daemon 22 continues to process further triggers from the hotplug event queue.

If the hotplug operation to be carried out on the I/O card in card slot no.2 is a delete card hotplug operation, the hotplug command module 24 invokes the CRA module 26, to determine whether the I/O card is essential or non-essential to the functioning of the computer system, as illustrated at step 120. This is required only for a delete card hotplug operation. The user/consumer modules of the I/O card being deleted are consulted to determine if the card is in use. This involves checking for resource usage of the modules of the card, using the CRA module 26. An I/O card is declared essential under situations where it is in use, and the computer system cannot successfully operate without it. In such a case, the delete card hotplug operation is not allowed to proceed, as illustrated at step 122. For example, root and swap partitions in a disk are considered essential for the functioning of operating system of the computer system. An I/O card is declared non-essential if it not in use, or it has non essential resource usage. Non-essential resource usage refers to those uses of the card that are not critical with regard to the computer system's functioning, but that may affect individual applications or cause data losses. Performing such an analysis with the CRA module 26 before a delete card hotplug operation is performed, reduces the likelihood of the computer system getting into an unstable state or even bringing the computer system down, if an essential card were to be deleted.

The analysis carried out by the CRA module 26 to identify the user modules of the I/O card and to perform a resource usage analysis of the modules is a complex process. This includes performing a series of checks to conclude if the card and the resources associated with it are essential to the functioning of the computer system. Two alternative approaches for the CRA module analysis are suggested.

In the first approach, a framework of dependent modules are built to perform usage queries, starting with the device driver 28 controlling the I/O card in the card slot no.2. The device driver 28 stores the usage attributes of modules directly interacting with it. For modules higher in the stack, each module stores the resource usage of modules above it, with this hierarchy finally reaching up to the user/consumer modules.

In the second approach, a flat framework is used for resource analysis, wherein all of the user/consumer modules are identified and directly queried, passing to each of them, an identifier of the I/O card in card slot no.2 which is to be deleted. The user modules in turn query the device driver 28, to get the resource usage. The above-mentioned flat framework for CRA module analysis has been implemented by classifying common functionalities into set of subsystems, for example, networking and mass storage functionalities. In addition, depending on a particular I/O card and its domain, other subsystems are also queried for resource usage. The subsystem specific CRA queries are implemented as plug-in modules called from a main CRA module. In the case where a multi-function I/O card supporting both networking as well as mass storage functionalities is to be deleted using a card delete hotplug operation, the card may have a network connection, running traffic, and a mass storage function of the card may have disks with resources critical to the operating system of the computer system. During CRA analysis, the main CRA module queries the networking and mass storage CRA plug-in modules to get the resource usage information.

The networking CRA plug-in module queries a networking device driver and related modules to see whether there are any active network connections. The main CRA module passes the identifiers of the networking functionality of the I/O card to the networking CRA plug-in module. The networking CRA plug-in module uses the passed in identifiers and checks if the card has networking usage. For example, if an IP address is configured over a particular networking identifier, that will be found out by querying the usage counts kept within the networking subsystem. The usage count is queried from the corresponding device driver for the networking functionality, or from the counters kept within the various modules of the networking stack. (For a TCP/IP stack, the Data Link Layer is the ideal module to query for usage statistics). The networking analysis also takes into account networking aggregates. Networking aggregates combine multiple hardware networking functions for performance enhancement and hardware redundancy. For example, two networking identifiers identifier1 and identifier2, are configured to service the same IP address. If idenitider1 is down, identifier2 will serve the IP address and vice versa. The networking CRA analysis does a cumulative analysis, such that this hardware redundancy is considered while deciding and reporting the criticality.

The mass storage CRA plug-in module queries a mass storage device driver and related modules to see whether there are any active mass storage usage supported by the I/O card. The main CRA module passes the identifiers of the mass storage functionality of the I/O card to the mass storage CRA plug-in module. The mass storage CRA plug-in module uses the passed in identifiers and checks if the card has storage usage. The usage queries include the following. The file systems are queried to see if any file system is supported by the passed in mass storage identifiers from the I/O card. All the processes in the system are analyzed to get information about the files in use. It is further checked to ascertain if these files are using the given mass storage identifiers of the I/O card. Swap/dump subsystems are queried to see if swap or dump is configured on the mass storage identifiers. When multiple disks are combined to provide a logical view of their combined storage capability, it is termed a logical volume. Logical volumes are queried to check if the disks participating in the volumes are served by the passed in mass storage identifiers. Disk mirroring is used to exactly replicate the data in one disk onto another. Multi-pathing is used to provide alternate hardware paths to the same disk. Both there techniques provide redundancy for mass storage. The mass storage CRA plug-in module does a cumulative analysis, such that this hardware redundancy is considered while deciding and reporting the criticality.

Usage of the card is reported in the CRA module analysis. This allows graceful shutdown of the resource usage, before proceeding with the delete card hotplug operation.

On completing its analysis, if the CRA module 26 determines that the hotplug operation on the I/O card associated with card slot no.2 is safe to proceed, the hotplug command module 24 issues a request to the hotplug system driver 16 to proceed with the hotplug operation. The hotplug command module 24 drives hotplug operations based on a generic set of interfaces in the operating system of the computer system. The hardware specific steps of a hotplug operation are carried out by the hotplug system driver 16. The hotplug system driver interacts with the device driver 28 of the card slot no.2, as well as other hotplug hardware as necessary. For example, if the I/O card is to be deleted and has networking and mass storage functionalities, the hotplug system driver 16 interacts with device drivers controlling the networking and mass storage functionalities. It also interacts with the hotplug hardware for power control operations at card slot no.2.

On completing its analysis, if the CRA module 26 determines that the hotplug operation on the I/O card associated with card slot no.2 is not safe to proceed, the CRA module 26 informs a user of the computer system what, if anything, can be done to shut down the resource usage of the I/O card, such that the card can be deleted.

When the hotplug operation is a card delete hotplug operation, as illustrated at step 124, the hotplug system driver 16 sends a request to the device driver 28 controlling the I/O card in card slot no.2 to quiesce the hardware. The device driver 28 must stop issuing further requests to the card and quiesce the card. Once the card is successfully quiesced, the hotplug system driver 16 controls disconnection of the power from card slot no.2, as illustrated at step 126. The device driver 28 cleans up any operating system resources allocated to the card, and reports success of the hotplug operation to the hotplug system driver 16, as illustrated at step 128. The hotplug system driver 16 proceeds with removal of resources and the operating system resource map is updated to reflect the deletion of the I/O card. The I/O card may be safely disconnected from the card slot no. 2 and removed from the computer system.

When the hotplug operation is an add card hotplug operation, the hotplug system driver 16 controls the connection of power to card slot no.2, as illustrated at step 130. The hotplug system driver 16 instructs the device driver 28 to initialize the state of the card, as illustrated at step 132. The hotplug system driver 16 also updates the operating system resource map to reflect addition of the card to the computer system. The I/O card is then ready for use by the computer system.

The power control operations at a card slot during hardware triggered card hotplug operations-are driven from the hotplug system driver 16. Since the user of the computer system has limited interaction with the system during a hardware triggered hotplug operation, the card slot power indicators change to indicate to the user the status of a hotplug operation. At the end of a hardware triggered add card hotplug operation, if the card slot is powered up (with the slot power indicators reflecting the same), this indicates that the hotplug operation succeeded and the card is operational. At the end of a hardware triggered add card hotplug operation, if the card slot remains powered down (with the slot power indicators reflecting the same), this indicates that the hotplug operation has failed. At the end of a hardware triggered delete card hotplug operation, if the card slot is powered down (with the slot power indicators reflecting the same ), this indicates the hotplug operation succeeded. At the end of a delete card hotplug operation, if the card slot remains powered up (with the slot power indicators reflecting the same), this indicates that the hotplug operation has failed.

A special case exists when it is desired to support hotplug operations of like hardware components, where one I/O card is removed and replaced with another of the same type. This is achieved by carrying out a 'suspend' card hotplug operation on a card in a card slot, and removing the card, and then placing a new card in the card slot and carrying out a 'resume' card hotplug operation. Before removing the card from the card slot, during the suspend card hotplug operation, the hotplug system driver 16 and the device driver 28 together take care of saving the current state of the card in software of the operating system of the computer system. This comprises saving a snapshot of the I/O card's hardware state before it is taken offline. None of the card related information in the operating system is removed, instead, the card's hardware state is updated to a new state reflecting this scenario, namely 'suspended'. The power to the card slot is then disconnected, and the card is removed. The user then replaces the card with one of the same type, and the hotplug service daemon 20 handles the hot plug operation on the new card as a resume card hotplug operation. The hotplug system driver 16 controls the reconnection of power to the card slot. The new card is mapped into the operating system of the computer system. The new card is intialized by updating its state with the state details which have been saved in the operating system for the previous card. The advantage of this, is that the replaced card continues operation from the state that was snapped and saved into the operating system for the previous card, without any re-initialization and configuration changes being necessary. This enhances the usage of hardware triggered hotplug operations, as it eliminates the need for further user interactions with the computer system for like-for-like I/O card replacements, after pressing the doorbell. Implementing like for like card replacements have certain other advantages as well with respect to operating system reconfigurations. On systems used for critical applications, the system administrator and the application owners spend a lot of time tuning the system configuration for optimal performance. Hence they would rarely like to modify the system configuration once it is fine tuned. If an I/O card becomes faulty, when the card is replaced with a new card, the new card will come back online without having to make any configuration changes. Like for like replacement also helps the computer system administrator to perform "preventive maintenance" of the I/O cards. Preventive maintenance is an activity where the cards under stress are changed periodically and replaced by similar cards to increase the mean time between failures. Using like for like replacement operations, a system administrator replaces the operating I/O card by another like card and thereby decreases the possibility of the card becoming faulty due to continuous usage.

Throughout processing of any hardware trigger and subsequent performing of any hotplug operation, the operating system of the computer system logs details of the hotplug operations for reference. This logging is a very important procedure, as hotplug operations change the operating system resource map. All the important events during the above mentioned steps are logged. The operating system ensures proper synchronization such that the transitions during hotplug operations of a card do not lead to inconsistent states of the operating system. The hotplug system driver 16 and the device drivers for the cards are key modules that ensure synchronization.

The invention claimed is:

1. A method of managing hardware triggered hotplug operations of one or more input/output (I/O) cards of a computer system, comprising receiving hardware triggers, each of which relates to a hotplug operation to be carried out on an I/O card associated with a card slot, placing said hardware triggers in a queue, processing said queue of hardware triggers, processing one or more of said hardware triggers, by analysing a hardware trigger to determine the card slot to which said hardware trigger relates, consulting a hotplug operation policy to determine whether hotplug operations are enabled for said card slot, if hotplug operations are not enabled for said card slot, ignoring said hardware trigger, if hotplug operations are enabled for said card slot, querying said slot to determine whether it contains a card, if said card slot does not contain a card, ignoring said hardware trigger, if said card slot does contain a card, determining the nature of the hotplug operation of said hardware trigger, if said hotplug operation is a delete card hotplug operation or a suspend card hotplug operation, determining whether said card is essential or non-essential to said computer system, and ignoring said delete card hotplug operation or said suspend card hotplug operation when said card is essential, and performing said delete card hotplug operation or said suspend card hotplug operation when said card is non-essential, or if said hotplug operation is an add card hotplug operation or a resume card hotplug operation, performing said add card hotplug operation or said resume card hotplug operation.

2. A method according to claim 1 in which processing said queue comprises monitoring said queue to determine if a hardware trigger has been dealt with.

3. A method according to claim 1 in which processing said queue comprises scanning said hardware triggers in said queue, determining if said queue comprises a multiple of hardware triggers relating to a hotplug operation to be carried out on an I/O card associated with a card slot, which triggers have been received at or substantially at the same time, and deleting all but one of the multiple of hardware triggers.

4. A method, according to claim 1 in which analysing said hardware trigger comprises determining an identifier of said card slot contained in said hardware trigger.

5. A method according to claim 1 in which consulting said hotplug operation policy to determine whether hotplug operations are enabled for said card slot, comprises determining that hotplug operation or operations are permitted for said card slot.

6. A method according to claim 5 in which analysing said hardware trigger comprises determining an identifier of said card slot contained in said hardware trigger, said hotplug operation policy comprises a list of card slot identifiers for which hotplug operations are permitted, and consulting said hotplug operation policy comprises comparing said card slot identifier determined from said hardware trigger with said card slot identifiers in said hotplug operation policy, and if said card slot identifier obtained from said hardware trigger matches a card slot identifier in said policy, determining that hotplug operations are permitted for said card slot.

7. A method according to claim 1 in which consulting said hotplug operation policy to determine whether hotplug operations are enabled for said card slot, comprises determining what hotplug operation or operations are permitted for said card slot.

8. A method according to claim 7 in which analysing said hardware trigger comprises determining an identifier of said card slot contained in said hardware trigger, said hotplug operation policy comprises a list of card slot identifiers for which hotplug operations are permitted, and consulting said hotplug operation policy comprises comparing said card slot identifier determined from said hardware trigger with said card slot identifiers in said hotplug operation policy, and if said card slot identifier obtained from said hardware trigger matches a card slot identifier in said policy, determining what hotplug operation or operations are permitted for said card slot.

9. A method according to claim 1 in which determining the nature of said hotplug operation of said hardware trigger comprises
ascertaining if said card is mapped into an operating system of said computer system, and
determining that said hotplug operation is a delete card hotplug operation or a suspend card hotplug operation if said card is mapped into said operating system, that said hotplug operation is a resume card hotplug operation if said card is mapped into said operating system and the state of said card in said operating system is determined to be suspended, and that said hotplug operation is an add card hotplug operation if said card is not mapped into said operating system.

10. A method according to claim 1 in which said card is determined to be essential to said computer system if it is determined to be in use and the use is essential for the functioning of said computer system.

11. A method according to claim 1 in which said card is determined to be non-essential to said computer system if it is determined to be in use and the use is not essential for the functioning of said computer system.

12. A method according to claim 1 in which said card is determined to be non-essential to said computer system if it is determined not to be in use.

13. A method according to claim 1 in which performing said delete card hotplug operation comprises quiescing said card and disconnecting power from said card slot.

14. A method according to claim 1 in which performing said add card hotplug operation comprises connecting power to said card slot and initialising said card.

15. A method according to claim 1 in which performing said suspend card hotplug operation comprises storing the status of said card in said operating system, quiescing said card, disconnecting power from said card slot, and removing said card from said card slot.

16. A method according to claim 1 in which performing said resume card hotplug operation comprises placing a new card in said card slot, reconnecting power to said card slot, and intializing said new card by updating its state with state details which have been saved in the operating system for a card previously removed from said card slot using a suspend card hotplug operation.

17. A method according to claim 1 in which one or more details of said hotplug operation of said hardware trigger are logged by said computer system.

18. A method of managing hardware triggered hotplug operations of one or more input/output (I/O) cards of a computer system, comprising receiving hardware triggers, each of which relates to a hotplug operation to be carried out on an I/O card associated with a card slot, placing said hardware triggers in queue, and processing said queue of hardware triggers; wherein
processing said queue comprises scanning said hardware triggers in said queue, determining if said queue comprises a multiple of hardware triggers relating to a hotplug operation to be carried out on an I/O card associated with a card slot, which triggers have been received at or substantially at the same time, and deleting all but one of said multiple of hardware triggers.

19. A method according to claim 18 in which processing said queue comprises monitoring said queue to determine if a hardware trigger has been dealt with.

20. A method according to claim 18 in which processing said queue comprises consulting a hotplug operation policy to determine whether hotplug operations are enabled for said card slot.

21. A method of managing hardware triggered hotplug operations of one or more input/output (I/O) cards of a computer system, comprising
receiving hardware triggers, each of which relates to a hotplug operation to be carried out on a I/O card associated with a card slot,
processing one or more of said hardware triggers by analysing a hardware trigger to determine the card slot to which said hardware trigger relates,
consulting a hotplug operation policy to ascertain whether hotplug operations are enabled for said card slot, if hotplug operations are not enabled for said card slot, ignoring said hardware trigger, and if hotplug operations are enabled for said card slot, further processing the hardware trigger.

22. A method according to claim 21 in which analysing said hardware trigger comprises determining an identifier of said card slot contained in the hardware trigger.

23. A method according to claim 21 in which consulting said hotplug operation policy to determine whether hotplug operations are enabled for said card slot, comprises determining that hotplug operation or operations are permitted for said card slot.

24. A method according to claim 23 in which analysing said hardware trigger comprises determining an identifier of said card slot contained in said hardware trigger, said hotplug operation policy comprises a list of card slot identifiers for which hotplug operations are permitted, and consulting said hotplug operation policy comprises comparing said card slot identifier determined from said hardware trigger with said card slot identifiers in said hotplug operation policy, and if said card slot identifier obtained from said hardware trigger matches a card slot identifier in said policy, determining that hotplug operations are permitted for said card slot.

25. A method according to claim 21 in which consulting said hotplug operation policy to determine whether hotplug operations are enabled for said card slot, comprises determining what hotplug operation or operations are permitted for said card slot.

26. A method according to claim 25 in which analysing said hardware trigger comprises determining an identifier of said card slot contained in said hardware trigger, said hotplug operation policy comprises a list of card slot identifiers for which hotplug operations are permitted, arid consulting said hotplug operation policy comprises comparing said card slot identifier determined from said hardware trigger with said card slot identifiers in said hotplug operation policy, and if said card slot identifier obtained from said hardware trigger matches a card slot identifier in said policy, determining what hotplug operation or operations are permitted for said card slot.

27. A method according to claim 21 in which said further processing of said hardware trigger comprises
querying said card slot to determine whether it contains a card, if said card slot does not contain a card, ignoring said hardware trigger, if said card slot does contain a card, determining the nature of said hotplug operation of said hardware trigger, if said hotplug operation is a delete card hotplug operation or a suspend card hotplug operation, determining whether said card is essential or non-essential to said computer system, and ignoring said delete card hotplug operation or said suspend card hotplug operation when said card is essential, and performing said delete card hotplug operation or said suspend card hotplug operation when said card is non-essential, or if said hotplug operation is an add card hotplug operation or a resume card hotplug operation, performing said add card hotplug operation or said resume card hotplug operation.

28. A method of managing hardware triggered hotplug operations of one or more input/output (I/O) cards of a computer system, comprising receiving hardware triggers, each of which relates to a hotplug operation to be carried out on a I/O card associated with a card slot, processing one or more of said hardware triggers by analysing a hardware trigger to determine the card slot to which said hardware trigger relates, querying said card slot to determine whether it contains a card, if said card slot does not contain a card, ignoring said hardware trigger, if said card slot does contain a card, determining the nature of the hotplug operation of said hardware trigger, and further processing said hotplug operation of said hardware trigger; wherein said further processing of said hardware trigger comprises.

if said hotplug operation is a delete card hotplug operation or a suspend card hotplug operation, determining automatically whether said card is essential or non-essential to said computer system, and ignoring said delete card hotplug operation or said suspend card hotplug operation when said card is essential, and performing said delete card hotplug operation or said suspend card hotplug operation when said card is non-essential, or if said hotplug operation is an add card hotplug operation or a resume card hotplug operation, performing said add card hotplug operation or said resume card hotplug operation.

29. A method according to claim 28 in which analysing said hardware trigger comprises determining an identifier of said slot contained in the hardware trigger.

30. A method according to claim 28 in which determining the nature of said hotplug operation of said hardware trigger comprises ascertaining if said card is mapped into an operating system of said computer system, and determining that said hotplug operation is a delete card hotplug operation or a suspend card hotplug operation if said card is mapped into said operating system, that said hotplug operation is a resume card hotplug operation if said card is mapped into said operating system and the state of said card in said operating system is determined to be suspended, and that said hotplug operation is an add card hotplug operation if said card is not mapped into said operating system.

31. A method of managing hardware triggered hotplug operations of one or more input/output (I/O) cards of a computer system, comprising receiving hardware triggers, each of which relates to a hotplug operation to be carried out on an I/O card associated with a card slot, processing one or more of said hardware triggers, by analysing a hardware trigger to determine the card slot to which said hardware trigger relates, querying said card slot to determine whether it contains a card, if said card slot does not contain a card, ignoring said hardware trigger, if said card slot does contain a card, automatically determining whether said card is essential or non-essential to said computer system, and ignoring said hotplug operation of said hardware trigger when said card is essential, and performing said hotplug operation of said hardware trigger when said card is non-essential.

32. A method according to claim 31 in which said card is determined to be essential to said computer system if it is determined to be in use and the use is essential for the functioning of said computer system.

33. A method according to claim 31 in which said card is determined to be non-essential to said computer system if it is determined to be in use and the use is not essential for the functioning of said computer system.

34. A method according to claim 31 in which said card is determined to be non-essential to said computer system if it is determined not to be in use.

35. A system for managing hardware triggered hotplug operations of one or more input/output (I/O) cards of a computer system, comprising a hotplug system driver which receives hardware triggers, each of which relates to a hotplug operation to be carried out on an I/O card associated with a card slot, and places said hardware triggers in a hotplug event queue, a hotplug service daemon which processes said queue of hardware triggers, processing one or more of said hardware triggers by analysing a hardware trigger to determine the card slot to which said hardware trigger relates, consulting a hotplug operation policy to ascertain whether hotplug operations are enabled for said card slot, if hotplug operations are not enabled for said card slot, ignoring said hardware trigger, if hotplug operations are enabled for said card slot, querying said card slot to determine whether it contains a card, if said card slot does not contain a card, ignoring said hardware trigger, if said card slot does contain a card, determining the nature of the hotplug operation of said hardware trigger, a hotplug command module which performs said hotplug operation of said hardware trigger on the instructions of said hotplug service daemon using said hotplug system driver, if said hotplug operation is an add card hotplug operation or a resume card hotplug operation, and a critical resource analysis module which, when said hotplug operation is a delete card hotplug operation or a suspend card hotplug operation, on the instructions of the hotplug command module, determines if said card is essential or non-essential to said computer system, and instructs said hotplug command module to ignore said hotplug operation of said hardware trigger when said card is essential to said computer system, and perform said hotplug operation of said hardware trigger when said card is non-essential to said computer system.

36. A system according to claim 35 which is implemented as software modules in an operating system of said computer system.

37. A method of adding an I/O card to a computer system, comprising
placing said card in a card slot,
creating a hardware trigger which relates to a hotplug operation to be carried out on said card in said card slot,
placing said hardware trigger in a queue,
processing said hardware trigger, by analysing said hardware trigger to determine said card slot to which said hardware trigger relates,
consulting a hotplug operation policy to ascertain whether hotplug operations are enabled for said card slot,
if hotplug operations are not enabled for said card slot, ignoring said hardware trigger,
if hotplug operations are enabled for said card slot, querying said slot to determine whether it contains a card,
if said card slot does not contain a card, ignoring said hardware trigger,
if said card slot does contain a card, determining that the hotplug operation is an add card hotplug operation, and performing said add card hotplug operation of said hardware trigger, to add said card to said computer system.

38. A method of deleting an I/O card from a computer system, comprising
creating a hardware trigger which relates to a hotplug operation to be carried out on said I/O card in a card slot,
placing said hardware trigger in a queue,
processing said hardware trigger, by analysing said hardware trigger to determine the card slot to which said hardware trigger relates,
consulting a hotplug operation policy to ascertain whether hotplug operations are enabled for said card slot,
if hotplug operations are not enabled for said card slot, ignoring said hardware trigger,
if hotplug operations are enabled for said card slot, querying said slot to determine whether it contains a card,
if said card slot does not contain a card, ignoring said hardware trigger,
if said card slot does contain a card, determining that the hotplug operation is a delete card hotplug operation, and performing said delete card hotplug operation of said hardware trigger.

39. A computer program, residing on a computer readable medium, for managing hardware triggered hotplug operations of one or more input/output (I/O) cards of a computer system, said program comprising
executable instructions that enable said computer system to
receive hardware triggers, each of which relates to a hotplug operation to be carried out on an I/O card associated with a card slot,
place said hardware triggers in a queue, process said queue of hardware triggers,
process one or more of said hardware triggers, by analyse a hardware trigger to determine the card slot to which said hardware trigger relates,
consult a hotplug operation policy to ascertain whether hotplug operations are enabled for said card slot,
if hotplug operations are not enabled for said card slot, ignore said hardware trigger,
if hotplug operations are enabled for said card slot,
query said slot to determine whether it contains a card,
if said card slot does not contain a card, ignore said hardware trigger,
if said card slot does contain a card, determine the nature of the hotplug operation of said hardware trigger, and
if said hotplug operation is a delete card hotplug operation or a suspend card hotplug operation, determine whether said card is essential or non-essential to said computer system, and ignore said delete card hotplug operation or said suspend card hotplug operation when said card is essential, and perform said delete card hotplug operation or said suspend card hotplug operation when said card is non-essential, or
if said hotplug operation is an add card hotplug operation or a resume card hotplug operation, perform said add card hotplug operation or said resume card hotplug operation.

* * * * *